US006819410B2

(12) United States Patent
Adameck et al.

(10) Patent No.: US 6,819,410 B2
(45) Date of Patent: Nov. 16, 2004

(54) PROCESS FOR IDENTIFYING AN EMBOSSED IMAGE OF A COIN IN AN AUTOMATIC COIN TESTER

(75) Inventors: Markus Adameck, Hamburg (DE); Manfred Eich, Hamburg (DE); Michael Hossfeld, Hamburg (DE)

(73) Assignee: National REjectors, Inc. GmbH (DE)

(*) Notice: Subject to any disclaimer, the term of this patent is extended or adjusted under 35 U.S.C. 154(b) by 0 days.

(21) Appl. No.: 10/342,024

(22) Filed: Jan. 14, 2003

(65) Prior Publication Data

US 2003/0169416 A1 Sep. 11, 2003

(30) Foreign Application Priority Data

Jan. 16, 2002 (DE) ........................................ 102 02 383

(51) Int. Cl.[7] ................................................ G06K 9/74

(52) U.S. Cl. ........................................ 356/71; 382/136

(58) Field of Search ......................... 356/71, 392, 393, 356/394; 382/136, 194, 328, 334

(56) References Cited

U.S. PATENT DOCUMENTS 5,033,602 A * 7/1991 Saarinen et al. ............ 194/334
5,133,019 A * 7/1992 Merton et al. .............. 382/136
5,220,614 A * 6/1993 Crain ......................... 382/136
5,224,176 A * 6/1993 Crain ......................... 382/136
5,236,074 A * 8/1993 Gotaas ....................... 194/331
5,839,563 A 11/1998 Takahashi
5,992,602 A * 11/1999 Zwieg et al. ............... 194/317
6,305,523 B1 * 10/2001 House et al. ............... 194/317
6,640,956 B1 * 11/2003 Zwieg et al. ............... 194/328
2002/0037096 A1 * 3/2002 Sugata ....................... 382/136
2002/0074210 A1 * 6/2002 Brandle et al. ............. 194/334

FOREIGN PATENT DOCUMENTS

DE 33 05 509 A1 8/1984

* cited by examiner

*Primary Examiner*—Michael P. Stafira
*Assistant Examiner*—Juan D Valentin, II
(74) *Attorney, Agent, or Firm*—Wall Marjama & Bilinski LLP

(57) ABSTRACT

A process for identifying an embossed image of a coin in an automatic coin tester, in which a coin is moved to an image receiver and a light source, the image receiver picks up at least one image of the embossed image of the coin, and a validation device compares the image to a first reference pattern to find out whether the first reference pattern is contained in the image which was picked-up. If the first reference pattern is contained in the image, the validation device determines whether a second reference pattern is contained in an area the position of which is determined relative to the position of the first reference pattern, the validation device producing a genuine coin or counterfeit coin signal for the coin depending on the coincidence of the image with the reference patterns.

15 Claims, 2 Drawing Sheets

PROCESS FOR IDENTIFYING AN EMBOSSED IMAGE OF A COIN IN AN AUTOMATIC COIN TESTER

FIELD OF THE INVENTION

The invention relates to a process for identifying an embossed image of a coin in an automatic coin tester.

BACKGROUND OF THE INVENTION

DE 330 55 09 A1 has made known an optical coin validation device. Here, a coin is illuminated from a light source at an angle from the surface perpendicular and the reflected light is recorded by two radiation receivers. The images each picked up by the radiation receivers are compared to each other to determine the degree of coin gloss. To this end, the values of the signals are divided by each other. The quotient obtained for the coin indicates the degree of gloss which is used to differ between the genuine and counterfeit natures of the coin.

U.S. Pat. No. 5,839,563 has made known an optical coin tester which identifies a coin on the basis of a first pick-up of the light reflected from the embossed image and a second pick-up of the light reflected from the border of the coin. Also, a proposal is made to record images of the opposed sides of the coin and to employ them for coin identification. The coin to be identified lies on a glass pane and is lit up by ring-shaped lighting sources from below. The embossed image which is picked up is transformed into polar coordinates and the angle is determined at a maximum intensity for a radius value. The angle is compared to the recorded reference, which determines the angle of rotation. It is not the topological profile of the coin which is evaluated here, but it is an intensity profile instead.

SUMMARY OF THE INVENTION

It is object of the invention to provide a process for identifying an embossed image of a coin in an automatic coin tester which permits to identify the coin by simple means in a reliable manner.

According to the invention, the object is attained by the process steps of claim 1. Advantageous aspects constitute the subject of the sub-claims.

In the inventive process, the coin to be identified is moved to an image receiver and a light source. The image receiver picks up at least one image of the embossed image of the coin. A measuring device compares the image to a first reference pattern to the effect whether the first reference pattern is contained in the image which was picked up. In an aspect, a genuine coin or counterfeit coin signal is produced already as a result of a comparison to a first reference pattern.

If the validation device finds the first reference pattern in the image which was picked up the validation device preferably determines whether a second reference pattern is contained in a predetermined area the location of which is determined relative to the position of the first reference pattern. In this step, the region of search for the second reference pattern is restricted on the basis of the position of the first reference pattern. This causes the search for the second reference pattern to focus on relevant areas and reduces the procedure of search. Because of a coincidence of the image with the reference pattern(s), the validation device produces a genuine coin or counterfeit coin signal for the coin to be validated with further reference parameters being adapted to be taken into account. In the inventive process, it is preferred that two reference patterns be compared to the image which was taken up. A determination is made for the two reference patterns as to whether they are contained in the image which was taken up. Further, a determination is made for the two reference patterns whether they are contained in the image which was taken up, in the predetermined position relative to each other. This restricts the region of search for the second reference pattern, on one hand, but takes into account an extra information on the relative position of the reference patterns with respect to each other. The result is that a particularly reliable outcome may be obtained approximately rapidly.

It is appropriate that the first and second reference patterns concerned be partial images forming the embossed image. The inventive process allows to employ more reference parameters of the coin and its embossed image to determine the genuine coin or counterfeit coin signals.

In a preferred aspect, the light source illuminates the embossed image from a plurality of directions and the image receiver records a separate image of the embossed image for each direction of lighting. If one-colour lighting is used the embossed image is illuminated from different directions in a successive time sequence and one image each is picked up. If multi-colour lighting is used it is possible to pick the images up simultaneously with each image receiver then being responsive to one colour only and providing one pick-up by one lighting. In a very specific aspect which is preferred, a differential image is produced which, as the image picked up, is compared to the reference pattern. The processing of images using illumination from different directions and the production of a differential image is referred to as a Selective Stereo Gradient Process (SSG process). The SSG process, because of an illumination from different directions, cannot be deluded by the photo of an embossed image because the pick-up of a photo does not change, when illuminated from different directions and, hence, the differential image will neutralize itself.

In an appropriate further aspect, the image which is picked up is binarized, i.e. converted into a image which merely has two signal types for black and white. A uniform threshold value, e.g. the grey-scale mean value of the image picked up, may be employed to binarize the image. Likewise, it is possible to accomplish binarization with local threshold values, e.g. by using a maximum-enthropy method.

It is preferred to determine the threshold value according to the maximum enthropy method where the threshold value $0 \leqq t \leqq 255$ is chosen such as to make the “total” enthropy a maximum:

$$H = -\sum_{i=0}^{t} p_i \log_e p_i - \sum_{j=i+1}^{255} p_j \log_e p_j$$

where $p_j$ is the fraction of the pixels having the grey-scale value i. The first term may be construed to be as a bright foreground and the second term as a dark background here.

In a preferred aspect of the process, the image receiver picks up an overall image of the embossed image from which the validation device determines the diameter of the coin to be identified. The diameter may be employed by the validation device as a further magnitude to discriminate a counterfeit coin. In a further aspect of the process, the validation device also determines the midpoint of the embossed image in the overall image and transforms the overall image into polar coordinates wherein a first coordinate indicates the distance from the midpoint and the second coordinate indicates an angle of the radius beam from an orientation determined for the whole image, for any point in the embossed image.

Such transformation into polar coordinates, apart from ensuring an identification process which saves computation time and is rotation and translation invariant, also has the advantage that it is easy to restrict and locate regions of search for the reference patterns. Thus, for instance, a region of search for the first reference pattern may be restricted already by predetermining a radius interval for a search for this region. In such a case, an angle interval would not be preset.

For a precise determination of the midpoint during transformation, three or more locations are determined on the coin border from which the midpoint is determined for the image which was picked up.

In a preferred further aspect of the process, the reference patterns to be searched for are preferably selected randomly from a multiplicity of reference patterns. Thus, at the beginning of the process, it is not sure which features to examine on the coin to be tested. Likewise, the inventive process allows to vary the parameters for an identification of a counterfeit coin following a previously generated counterfeit coin signal such that a deviation from the reference patterns will lead earlier to the production of a counterfeit coin signal. A coin is identified as a counterfeit coin earlier if the requirements for identifying a counterfeit coin signal are decreased. This step makes it possible that if counterfeit money is inserted in the automatic coin tester the requirements for producing a genuine coin signal are increased. Accordingly, a provision can be made to decrease the requirements again after a multiplicity of coins which were discriminated as being genuine.

In an advantageous aspect which is specifically recommended for embossed images of a very fine structure more than two reference patterns are searched for in the image which was picked up with the region of search a further reference pattern resulting in dependence on the regions of search for the preceding reference patterns.

BRIEF DESCRIPTION OF THE DRAWINGS

An advantageous aspect of the process will now be explained in more detail with reference to the figures which follow.

DETAILED DESCRIPTION

Figure 1:
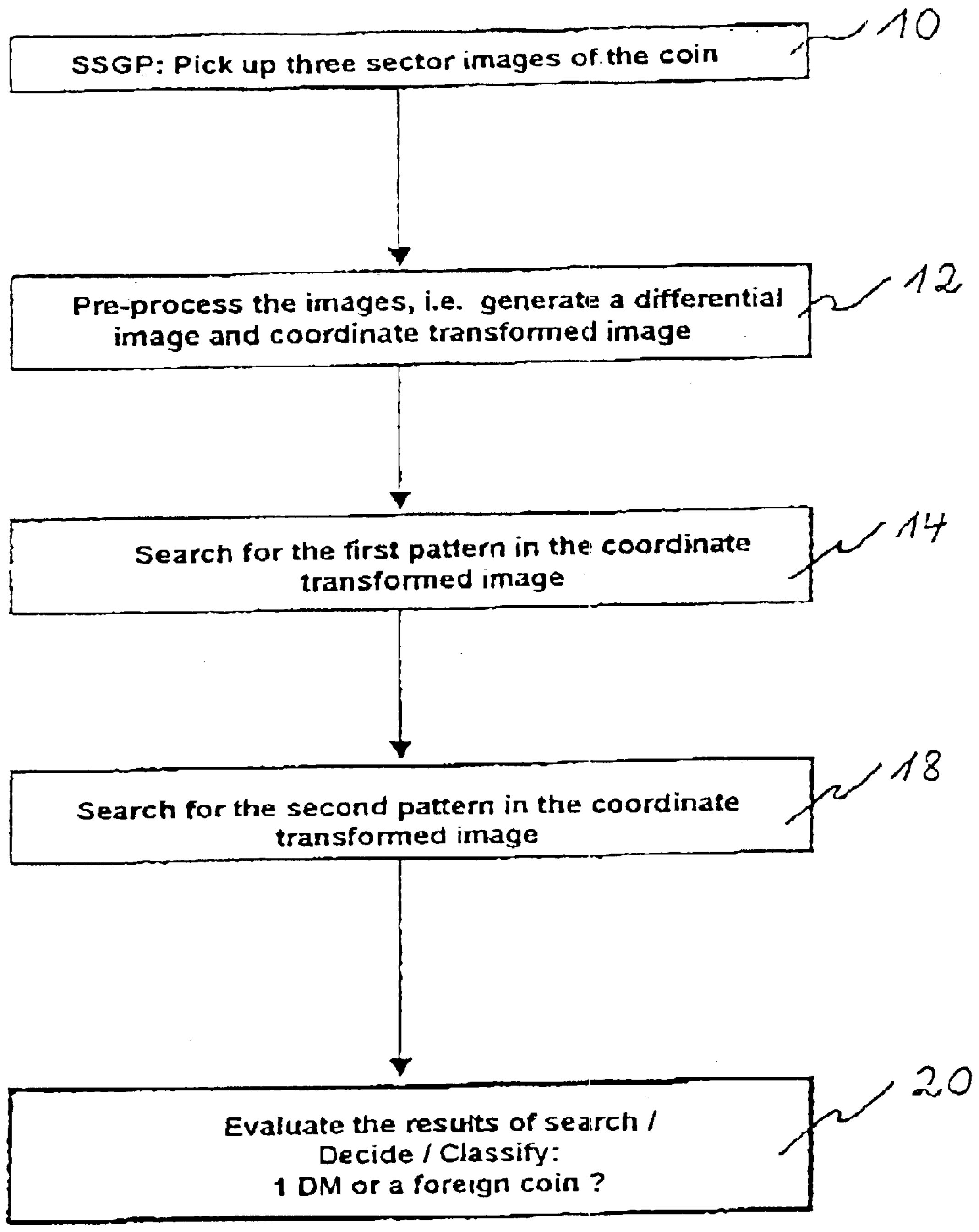
FIG. 1 shows a flow scheme for the sequence of the inventive process.

The inventive process is explained below for a pick-up of the embossed image, using the Selective Stereo Gradient Process (SSG process). Although it is not necessary at all to start out from this process applying the SSG process to circulating coins has shown that the process cannot be deluded by a photo of the coin and, for the rest, along with the inventive process, allows to reliably discriminate genuine and counterfeit coins.

In the inventive process, three sectors of the coin are picked up in a first step 10. The sector images could be picked up, in conjunction with the SSG process, either by a successive illumination of the embossed image from three different directions or by a successive illumination each using differently coloured light. The images are preprocessed in a succeeding step 12. Also, a differential image on which the subsequent identification process is based is calculated from the images obtained. The differential image and single steps of image preprocessing can occur in different sequences here. For example, the images picked up may initially be pre-processed in a few first steps and the differential image thus obtained can be reprocessed with the aid of certain image processing means. After the midpoint is determined for the image which was picked up the image is transformed into circle coordinates. The transformed image forms a basis of the analysis that follows. A first reference image is searched for in the transformed image in a succeeding process step 14. Using transformed images naturally ensures that there is a rotation and translation invariant identification process here.

A second reference pattern is searched for in the coordinate transformed process in a next process step. The region of search for the further process image is restricted here because of the result of search for the first reference image so that a search has to be made merely in a minor portion of the image which was picked up.

For a comparison of an image taken up with the first reference pattern, the admissible region of search is cut out of the coordinate transformed image. The region of search is subjected to folding with the binarized, first reference pattern. As a foreground information, the folded image is normalized to the number of white pixels existing in the reference pattern. A foreground threshold value is applied to the normalized image and is multiplied by the value of the folding.

Subsequently, a negative image is produced for the region of search and the first pattern. Afterwards, the negative-image region of search is subjected to folding with the negative-image region of search. The result of this folding is also normalized to the number of white pixels existing in the negative reference pattern. A background threshold value is applied to the normalized result of folding and is multiplied by the value of the folding. The two threshold values for the foreground and background foldings may be chosen to be different to weight the influences in the information with regard to a later AND operation in a differently heavy way. Preferably, the threshold values have been defined beforehand.

Afterwards, an AND operation is made for the foreground and background conditions, i.e. the results of folding multiplied by the threshold values are multiplied by each other. If a maximum exists at a certain point in the product this point will be the position of the first reference pattern in the image.

A region of search may now be predetermined for the second reference pattern on the basis of the point where the first reference pattern was found. It has proved to be an advantage here if the coordinate transformed image is rearranged so that the point where the first reference pattern was found is located at a predetermined location. The search in the region of search for the second result of search may be performed in the same manner as the above described search for the first re-ference pattern.

A final comparison step 20 evaluates the results of search and produces a genuine coin or counterfeit coin signal. In an aspect of the inventive process, a genuine coin is produced if the two reference patterns are found in the image which was taken up. Alternatively, it is also possible to incorporate more parameters.

Figure 2:
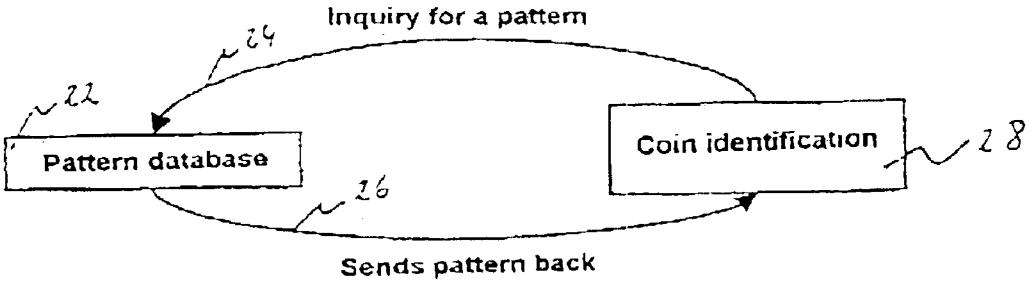
FIG. 2 shows a flow scheme for the continuation of the inventive process.

FIG. 2 relates to a further improvement of the inventive process. In this further improved process, a reference pattern 26 is delivered to the coin identification unit 28 from a database 22 with reference patterns following an inquiry 24. In the version of coin identification illustrated in FIG. 2, if an inquiry 24 is made for a second reference pattern, the position found for the first reference pattern may be communicated already so that the pattern database 22 also provides the coordinates of the respective reference pattern.

Figure 3:
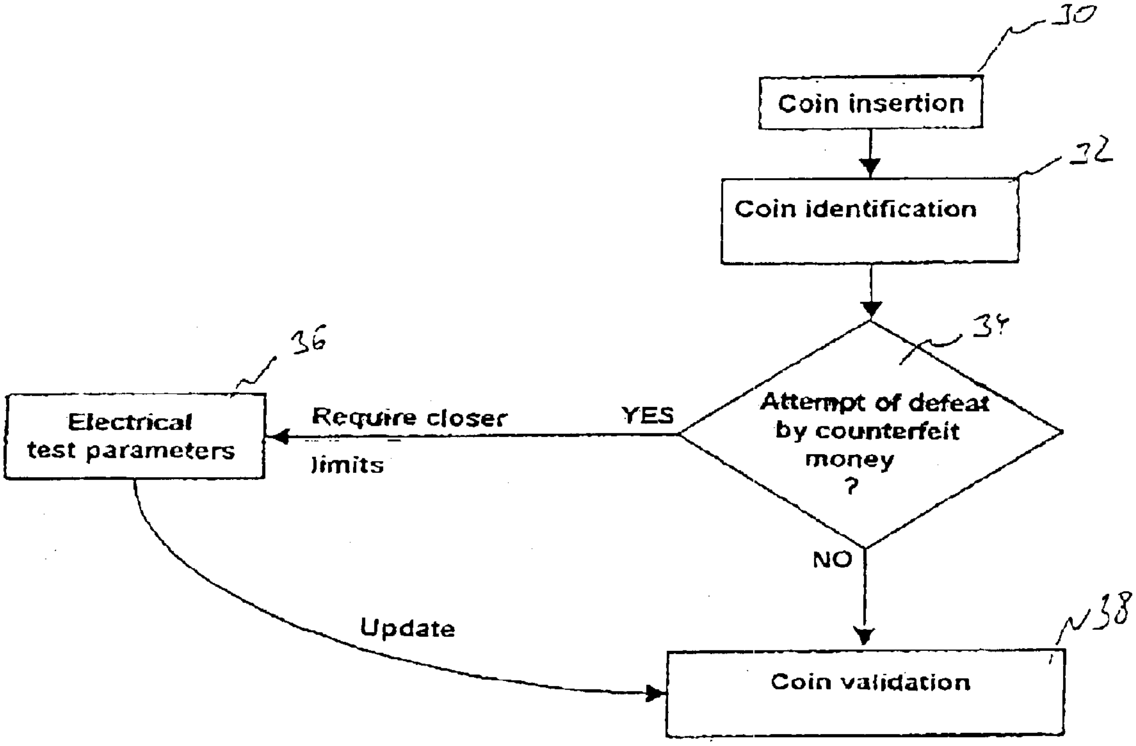
FIG. 3 shows a flow scheme for an adaptation of electrical test parameters.

FIG. 3 shows the process sequence of an adaptive coin validation process for an automatic coin tester.

A first step 30 comprising a coin insertion is followed by a coin identification 32. If the coin identification 32 reveals that counterfeit money was inserted an inquiry is made in 34, after which closer parameters are set for an electrical test in a process step 36. A coin validation is then made in a final step in which a counterfeit coin will be identified earlier if counterfeit money was inserted already previously.

What is claimed is:

1. A process for identifying an embossed image of a coin in an automatic coin tester, comprising the steps of:

moving a coin to an image receiver and a light source, picking up at least one image of the embossed images of the coin using an image receiver, comparing the image to a first reference pattern using a validation device to find out whether the first reference pattern is contained in the image which was picked up, said validation device producing a genuine coin or counterfeit coin signal for the coin depending on the coincidence of the image with the reference patterns and in which if the first reference pattern is contained in the image, including the further step in which the validation device makes a comparison as to whether a second reference pattern is contained in an area, the position of which is determined relative to the position of the first reference pattern.

2. The process as claimed in claim 1, wherein the first and second reference patterns are partial images of an embossed image.

3. The process as claimed in claim 1, wherein the validation device employs further reference parameters to determine the genuine coin or counterfeit coin signal.

4. The process as claimed in claim 1, including the steps of illuminating the embossed image from a plurality of directions using the light source and recording a separate image of the embossed image for each direction of lighting using said image receiver.

5. The process as claimed in claim 4, wherein a differential image is produced from the separate images which, as a picked-up image, is compared to the reference patterns.

6. The process as claimed in claim 1, wherein said at least one picked-up image is binarized.

7. The process as claimed in claim 6, wherein binarization of said at least one picked-up image is accomplished with a threshold value which is uniform for the whole image.

8. The process as claimed in claim 7, wherein binarization is accomplished with local threshold values.

9. The process as claimed in any claim 1, wherein the image receiver picks up an image of the entire embossed image from which the validation device determines the diameter of the coin.

10. The process as claimed in claim 7, including the steps of determining the midpoint of the embossed pattern in the image using said validation device and transforming the image into polar coordinates wherein a first coordinate indicates the distance from the midpoint and a second coordinate indicates an angel from an orientation determined for the image for any point in the embossed pattern.

11. The process as claimed in claim 7, including the steps of determining three or more locations on the coin border and determining the mid-point of the embossed image from said locations using said validation device.

12. The process as claimed in claim 1, including the step of searching the first reference pattern in a predetermined area.

13. The process as claimed in claim 12, wherein the reference patterns to be searched for are selected from a multiplicity of reference patterns.

14. The process as claimed in claim 1, wherein after a counterfeit coin signal is produced in the automatic coin tester, the parameters for identifying a counterfeit coin are varied such that a slight deviation from the reference pattern already causes a generation of a counterfeit coin signal.

15. The process as claimed in claim 1, including the step of searching more than two reference patterns in the image wherein the regions in which one of the reference patterns is searched for will result for the second and further reference patterns, depending on the regions of search for the preceding reference patterns.

* * * * *

UNITED STATES PATENT AND TRADEMARK OFFICE
CERTIFICATE OF CORRECTION

PATENT NO. : 6,819,410 B2
DATED : November 16, 2004
INVENTOR(S) : Adameck et al.

It is certified that error appears in the above-identified patent and that said Letters Patent is hereby corrected as shown below:

Title page,
Item [73], Assignee, should read:
-- [73] Assignee: National Rejectors, Inc. GmbH (DE) --

Signed and Sealed this

Twenty-second Day of February, 2005

JON W. DUDAS
*Director of the United States Patent and Trademark Office*